Figure 1:
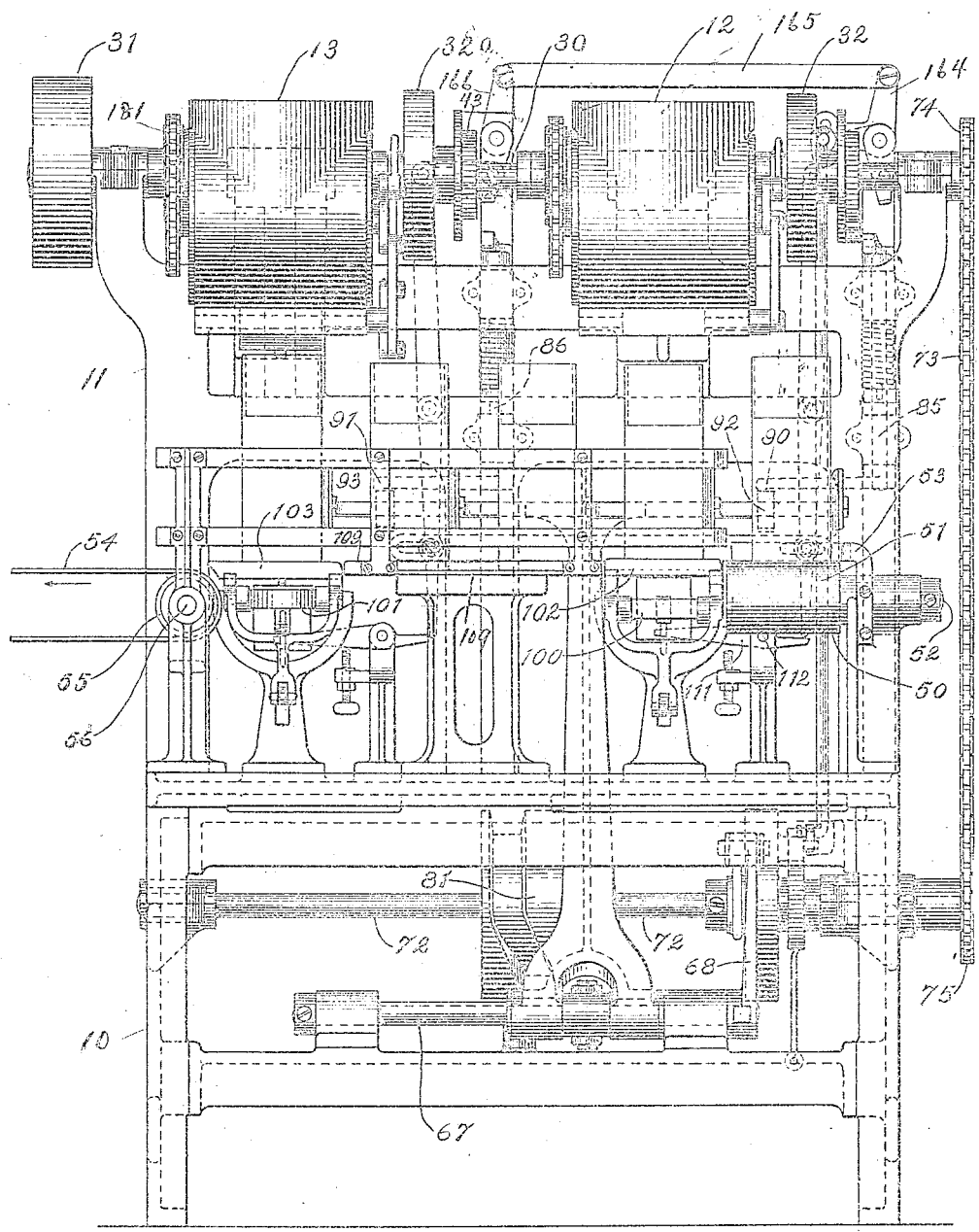

W. S. SCALES.
WEIGHING MACHINE.
APPLICATION FILED FEB. 29, 1904.

924,191.

Patented June 8, 1909.
6 SHEETS—SHEET 1.

W. S. SCALES.
WEIGHING MACHINE.
APPLICATION FILED FEB. 29, 1904.

924,191.

Patented June 8, 1909.
6 SHEETS—SHEET 2.

Witnesses:
Walter P. Abell
J. W. Harrison

Inventor:
W. S. Scales
by Wright Brown Quimby
his atty

W. S. SCALES.
WEIGHING MACHINE.
APPLICATION FILED FEB. 29, 1904.
924,191.
Patented June 8, 1909
6 SHEETS—SHEET 6.
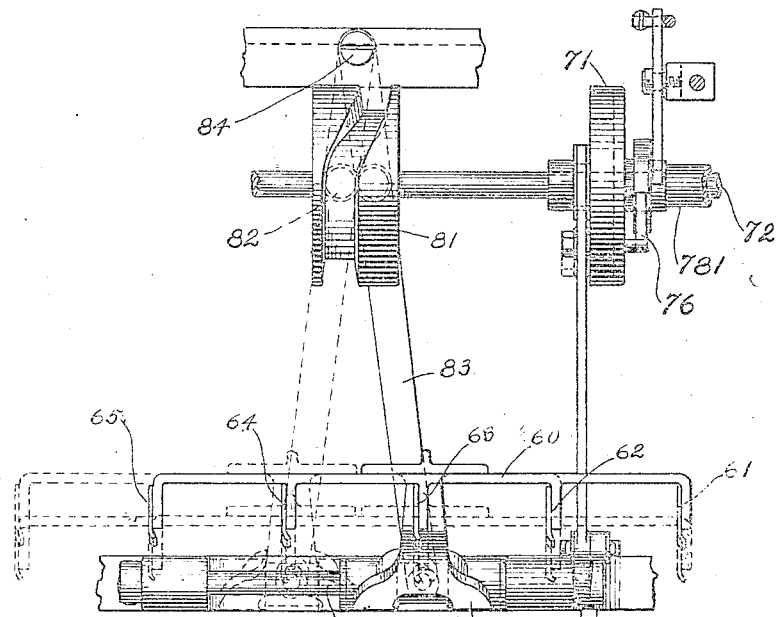
Fig. 7.
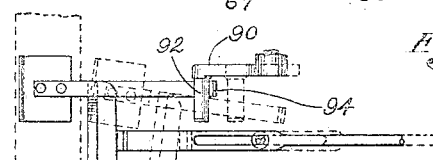
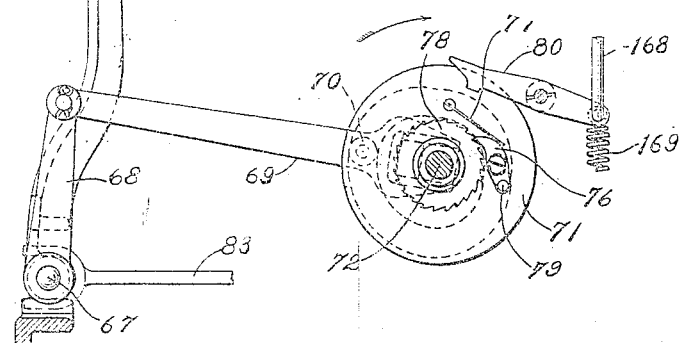
Fig. 8.
Witnesses:
Inventor:
W. S. Scales
by Wright, Brown & Quinby
his attys

UNITED STATES PATENT OFFICE.

WILLIAM S. SCALES, OF BOSTON, MASSACHUSETTS, ASSIGNOR, BY MESNE ASSIGNMENTS, TO CITY TRUST COMPANY, A CORPORATION OF MASSACHUSETTS.

WEIGHING-MACHINE.

No. 924,191.

Specification of Letters Patent.

Patented June 8, 1909.

Application filed February 29, 1904. Serial No. 195,775.

*To all whom it may concern:*

Be it known that I, WILLIAM S. SCALES, of Boston, in the county of Suffolk and State of Massachusetts, have invented certain new and useful Improvements in Weighing-Machines, of which the following is a specification.

The object of the invention is to provide mechanism for rapidly filling packages with material, and accurately weighing the delivered material so that each filled package shall be of a predetermined weight.

The invention is especially intended to be employed in the form of a packaging machine in which each package is partially filled from one chute or hopper and receives the remainder of its supply from another chute or hopper, but it is adapted in many of its features to be employed in the form of a simple packaging-machine in which only one feed-chute is used.

Packaging machines have been proposed or constructed in which rapidity combined with accuracy was partially attained by first measuring into the package a quantity of material somewhat less than the total required, and subsequently adding sufficient material to bring it to a predetermined weight, the measuring of material into one package and the addition of material into another package taking place simultaneously. Machines have also been devised whereby the package was first partially filled, without regard to weight or measure, so long as the amount of material delivered therein was less than the quantity required in the filled package, after which the required amount was added to bring it to a predetermined weight. This was accomplished by means of a supply chute, the outlet to which was opened a predetermined time, during which a receptacle was partially filled; the amount of material flowing through the outlet being determined approximately by the duration of the time of said opening. It has been found, in practice, that "measuring" certain classes of materials is objectionable for various reasons. In the practical construction of these machines for initially measuring the material, the measuring devices frequently crush and injure material such as coffee-beans, and grind the crushed material, such as sugar, into its operative parts to an extent sufficient to clog them and prevent the accurate operation of the machine. It has also been found that the flowing of material for a predetermined time in machines of the second referred to type, is, in practice, so uncertain with some materials that a large margin has to be allowed between the average first load or supply, and the required amount, which results in greatly decreasing the output of the machine.

The present machine is illustrated as embodied in a machine in which the material is weighed from two different sources of supply into different packages, and successively into the same package, and is especially designed for the purpose of overcoming the objections to the two types of machines hereinbefore referred to. By insuring a more nearly uniform supply from the first feed-chute and therefore reducing the amount to be supplied by the small stream from the second chute, the speed of the machine is increased without impairing its accuracy.

The main feature of my invention consists in two weighing scales upon which packages to be filled are successively moved, each scale having an independent feed-chute with means whereby a package is partially filled nearly up to its required weight on one scale, whence it is moved to the second scale where it receives its final supply, the first feed-chute having a delivery port much larger than the second one.

Another feature of the invention consists of package-moving mechanism and means whereby the movement of the packages is controlled by the joint action of the two scales.

My invention further consists in numerous other features of construction and arrangement of parts which will be more particularly described and claimed.

Figure 2:
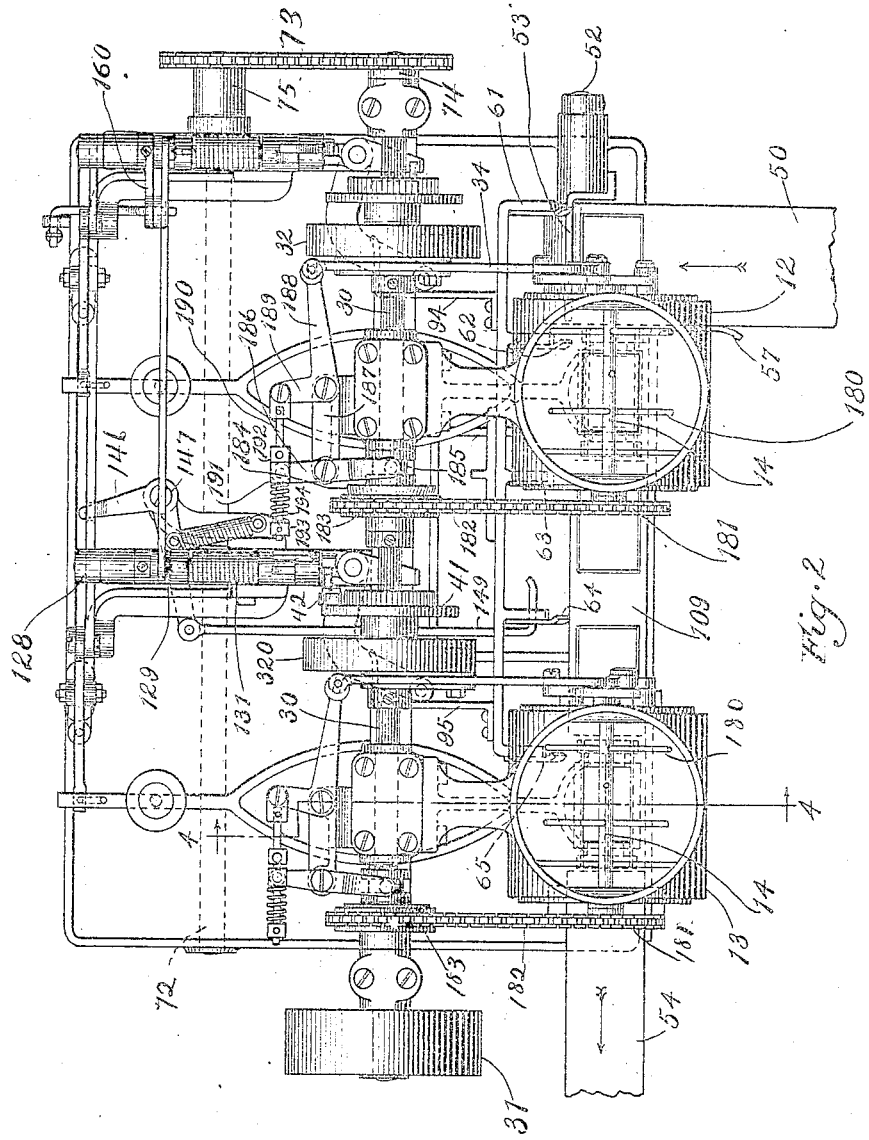
Figure 3:
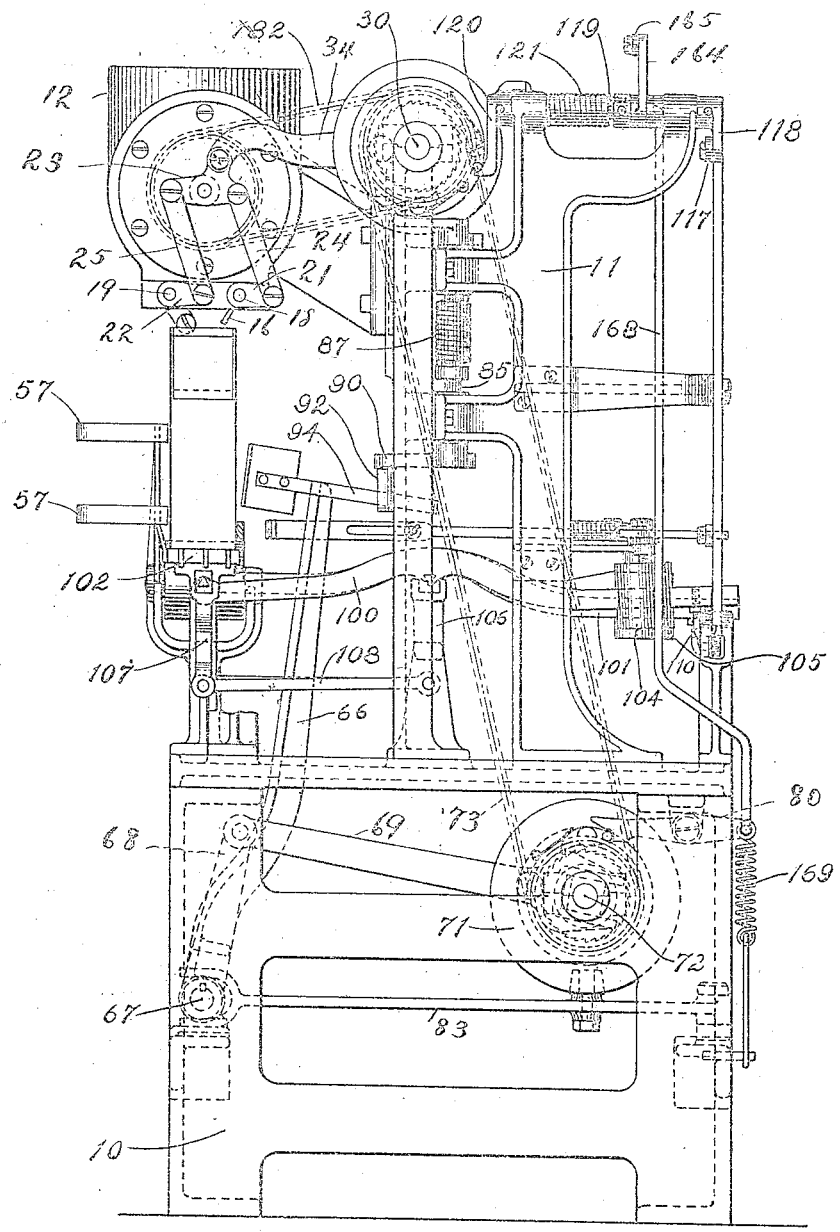
Figure 4:
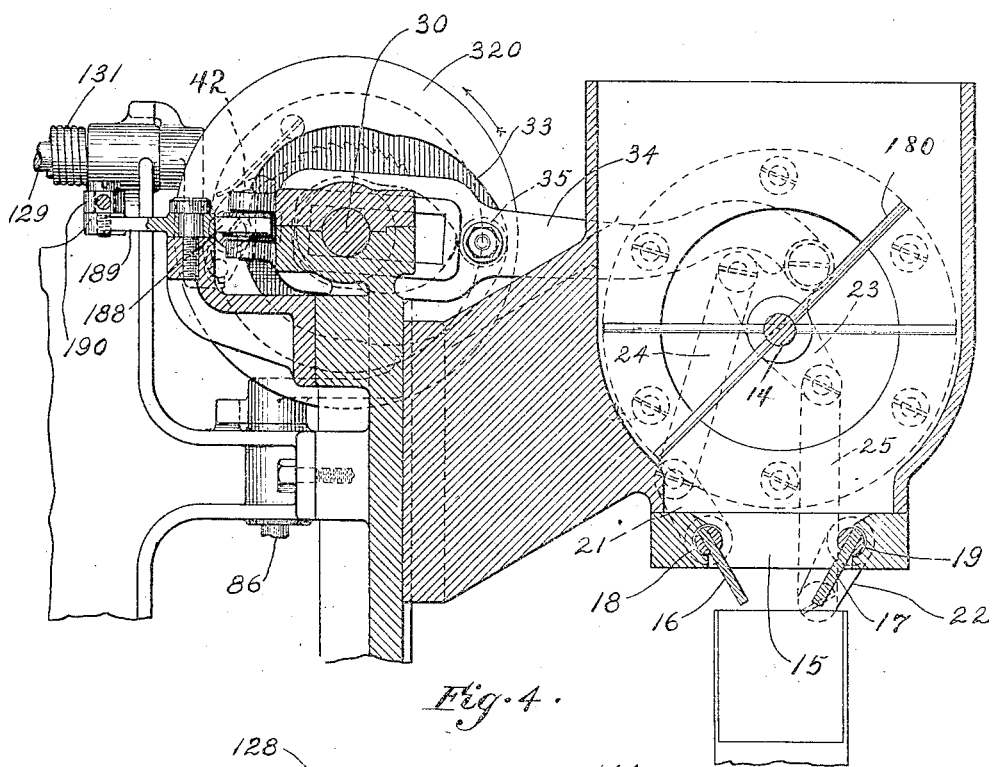
Figure 5:
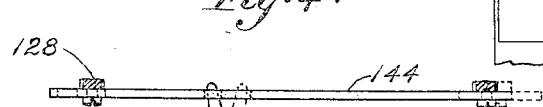
Figure 6:
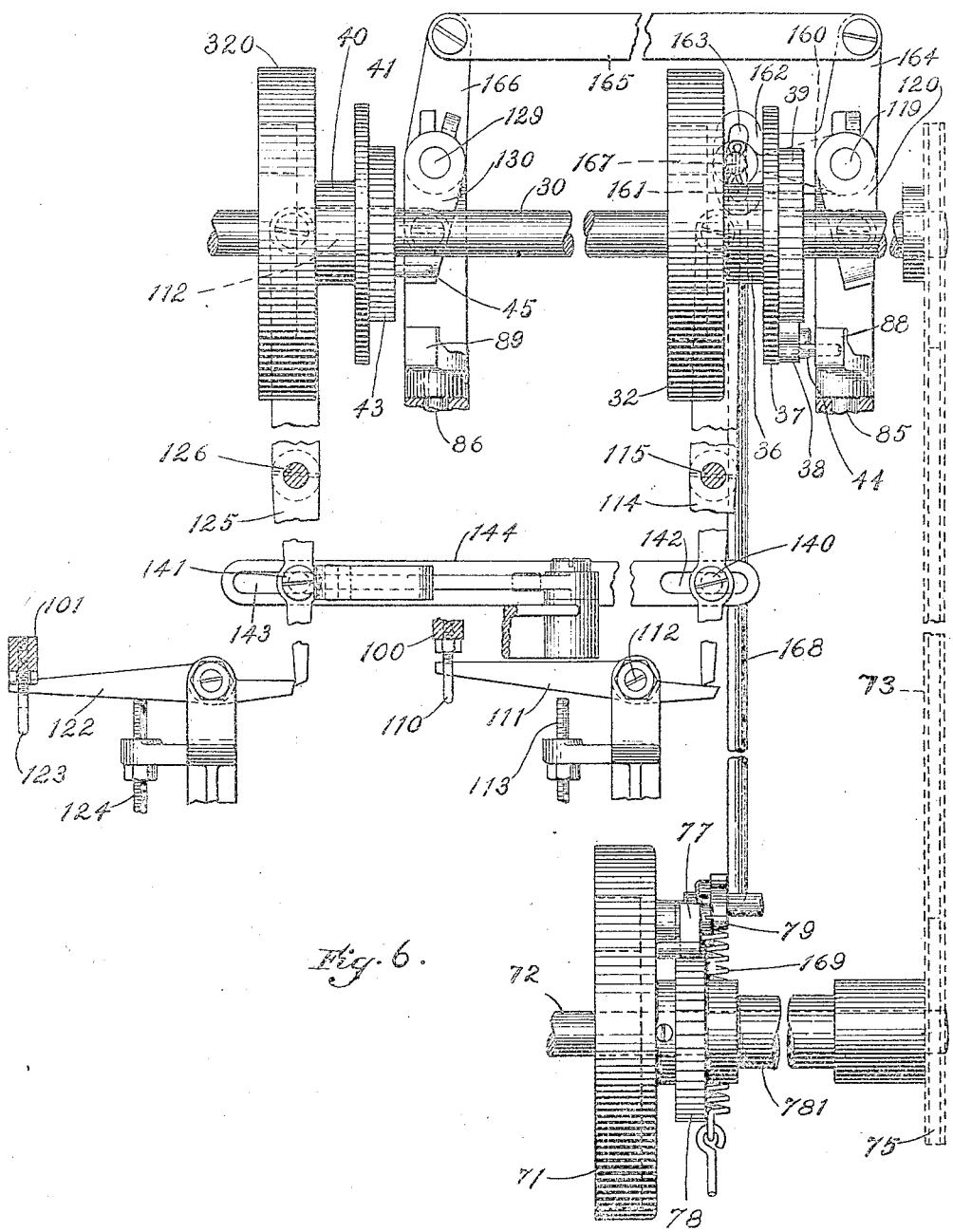

On the accompanying drawings, which illustrate one embodiment of the invention— Figure 1 represents in front elevation a packaging machine. Fig. 2 represents a plan view of the same. Fig. 3 represents a side elevation of the machine. Fig. 4 represents an enlarged section on the line 4—4 of Fig. 2. Fig. 5 represents in detail a connection between the package-moving mechanism and the devices which trip the gate opening and closing mechanism to cause the opening of the gates for the delivery of the material into the packages. Fig. 6 represents in detail the connections between the scales and the gate opening and closing mechanism, and also the connections between the gate opening and closing mechanism and therefore the scales with the package-moving mechanism in consequence of which the packages are moved off of and onto the scale-pans at the proper time and in proper sequence. Fig. 7 represents in plan view the mechanism for effecting the operation of the package-moving devices. Fig. 8 is a side elevation of the same, and illustrates the operation of the tripping mechanism which controls the operation of the package-moving devices.

I desire to have it understood that the terms which I employ in the specification and succeeding claims are for the purpose of description and not of limitation, and further that the invention is not limited to the particular combination of elements or parts which I have seen fit to employ, and that it may be embodied in other forms without departure from its spirit and scope.

It has been briefly stated that the invention contemplates the employment of two weighing mechanisms, each comprising a feed-chute with gate opening and closing mechanism, and a scale which controls the operation of the gate-opening and closing devices; and that package-moving mechanism is provided by means of which a package into which has been roughly weighed a predetermined amount of material is carried from the primary weighing mechanism to the secondary weighing mechanism by which a sufficient addition of material is accurately made to bring the package to an exact weight. The primary weighing mechanism is constructed in such manner that a large stream of material is permitted to flow into the package to bring it approximately to the desired final weight, and the secondary weighing mechanism is so formed that the material which it adds to the package is delivered in a thin or drip stream. The machine, as a whole, is preferably so constructed that the addition of material by the drip stream to bring the package to its exact predetermined weight takes approximately no longer, than the delivery of the material from the primary weighing mechanism into its scale. Inasmuch as a package cannot be moved from the primary weighing mechanism to the secondary weighing mechanism until the scale-pan of the secondary weighing mechanism is emptied, the package-moving mechanism is so related to both weighing mechanisms that the transfer of the package takes place only after the delivery of material into the packages in both weighing mechanisms has been completed.

Referring to the drawings, it will be seen that the machine therein illustrated is provided with a main frame indicated as a whole at 10, from which rises a superstructure or framework indicated as a whole at 11, and consisting of an upright or standard with connected braces. To this upright are attached by brackets or supports the two hoppers or chutes 12 and 13 of the primary and secondary weighing mechanisms. In each of the hoppers, there is an agitating device, indicated as a whole at 14, which is operated at proper times to stir or agitate the material and cause its free flow into the package when the gates are open. All of the operative parts of the machine are actuated from a shaft 30, which is journaled in the upright or superstructure of the machine, and which is driven by a pulley 31. This shaft is preferably located directly in the rear of the hoppers, so as to be conveniently disposed with relation to the gate-opening and closing mechanisms to simplify the connections between said mechanisms and said shaft.

*The gates and their operating mechanism.*— The gates or cut-offs of the two hoppers may be formed in any suitable way, to open and close the delivery ports 15. In Fig. 4, the gates 16 and 17 are illustrated as connected to shafts 18 and 19, respectively, to which are attached the rocker-arms 21 22, respectively. Loosely mounted on the shaft of the stirrer device of each chute or hopper, is a three-armed lever 23, the arms of which are connected with the arms 21 23 by links 24 25. By rocking the three-armed lever 23 in one direction or the other, the gates are opened and closed, as the case may be. For the gate-opening and closing mechanisms, there are located loosely upon the shaft two path-cams 32 and 320, respectively, each having a cam-groove 33. A connecting rod 34 is arranged in juxtaposition to each path-cam, its forward end being connected to one of the three-armed levers 23, and its rear end being slotted to receive the shaft 30. Each connecting rod has near its rear end a roll 35, which enters the groove 33 of one of the cams. The cam-groove is so formed that during the first half of its rotation, the connecting-rod 34 will be moved forward to open the gates 16 and 17, and on the completion of its rotation, the said gates will be closed. The cam 32 has upon its hub 36 a circumferential flange 37, carrying a pawl 38 which at the proper time is permitted to engage with a ratchet 39 fast upon the shaft 30. The cam 320 has a similar hub 40, a flange 41, a pawl 42 (not seen in Fig. 6,) to engage a ratchet 43 likewise fast upon the shaft 30. The pawl 38 has a laterally-projecting pin 44, there being a similar pin 45 on the pawl 42. These pins are adapted to be engaged by mechanism to be subsequently described for the purpose of moving the pawls out of engagement with their respective ratchets to effect a cessation of rotation of the cams 32 and 320, and thereby maintain the gates in the primary and secondary weighing mechanism open or closed, as the case may be.

Inasmuch as this mechanism is dependent upon the operation of the scales, and also upon the operation of the package-moving mechanism, I will reserve its description until said scales and said package-moving mechanism have been described.

*Package moving and transferring mechanism.*—The means for primarily feeding unfilled cartons to the machine comprises an endless belt or carrier 50, as shown in Figs. 1 and 2. It is supported in part by a roll 51 journaled upon a stud-shaft 52. The cartons in their movement toward the machine are stopped by a bracket 53, as illustrated in said figures.

The package-moving mechanism to be described operates to remove a carton or package from the carrier 50 and to transmit it across the face of the machine into the scale-pan of the primary weighing mechanism, and subsequently by successive steps to feed the approximately-filled package to the scale-pan of the secondary weighing mechanism to complete the filling of the package by the addition thereto of sufficient material to bring it to the exact weight, and thereafter remove the package and transfer it to a delivering carrier 54, which is illustrated as supported in part by a roll 55 on a shaft 56. As the package is carried toward the machine by the belt 50, it is held against lateral movement to the left by guides 57 until it is in position to be fed laterally to the primary scale-pan, as will be explained.

The package-moving or transferring mechanism comprises a long bar 60 provided with forwardly projecting equally-spaced fingers 61 62 63 64 and 65, the distance between each pair of adjacent fingers being sufficient to receive a carton. The bar 60 is supported upon the upper end of an arm 66, terminating at its lower end in a hub which is keyed to slide upon a rock-shaft 67 journaled in the front of the main frame 10. The shaft 67 is rocked by an arm 68, to which is connected a pitman 69 having a roll 70 entering a cam-path in a cam 71 shown in Fig. 6 as secured by a screw on a shaft 72, (see Figs. 3, 7 and 8.) The said shaft 72 is journaled in the main frame 10 in the rear of the shaft 67 and it receives power at certain times from the shaft 30 by means of a sprocket-chain 73 and sprocket-wheels 74 75 on said shafts 30 and 72, respectively. The cam 71 carries a pawl 76 which is adapted to be held by a spring 77 in engagement with a ratchet 78 upon a sleeve 781 loose on the shaft 72 and having keyed upon it the sprocket-wheel 75 so that when the cam and ratchet are thus connected, the rotation of the sleeve 781 and ratchet 78 will by reason of the formation of the cam-path, effect an oscillatory movement of the arm 68 and therefore of the arm 66 of the package-moving or transferring mechanism and will also effect a rotation of the shaft 72. The pawl 76 carries a laterally projecting pin 79 with which may be engaged a pivoted trip 80 to move the end of the pawl out of engagement with the ratchet whenever desired, and stop the rotation of the shaft 72. This trip is controlled by the scales, as will be subsequently explained, the controlling mechanism being such that the pawl is permitted to engage the ratchet and rotate therewith for a complete rotation only after both scale-beams have been tipped.

For the purpose of effecting a lateral translatory movement of the bar 60, there is keyed upon the shaft 72 a peripherally grooved cam 81, into the groove of which extends a roll 82 on a lever 83 fulcrumed at its rear end at 84 on the frame and having its front end forked to engage the head of the arm 66. Whenever the cam 71 is permitted to rotate, the cam 81 likewise rotates but the two cams are so related to each other that the package-moving bar 60 is moved forward, then to the left a distance equal to the space between two of the fingers, then rearward, and then to the right to its initial starting point, as illustrated by the arrows in Fig. 5, which illustrate the movement of the arm 66. After the carriage-moving bar has been forced forward and then moved to the left to transfer the packages, upon its rearward movement it is caused to actuate certain trips to permit the opening of the gates in the primary and secondary mechanism.

*Trip mechanism for controlling the opening of the gates.*—Referring now to Figs. 6 and 7, it will be observed that journaled in brackets in the upright 11 are two rock-shafts 85 86 respectively. These two rock-shafts 85 86 are located in proximity to the cams 32 and 320, as best shown in Figs. 1 and 6. Said shafts are held by springs 87 in position to cause trips 88 89 on the upper ends thereof to project into the path of the pins 44 45 of the pawls 38 44 which have been previously described, so that when the cams 32 and 320 have rotated until the pins 44 45 are engaged by said trips, said pawls are lifted out of engagement with the ratchets 39 and 43 to stop the cams in position with the gates 16 and 17 of the two weighing mechanisms closed to cut off the supply of material. The lower ends of the shafts 85 86 are provided with arms 90 91 respectively, carrying depending pins 92 and 93. These pins are located in the path of hooks 94 95 projecting rearwardly from the bar 60, so that when the said bar 60 moves forward, the hooks engage the pins 92 93, rock the shafts 85 86 and move the trips 88 89 out of the way of the pins 44 45 so that the pawls 38 and 42 may engage the ratchets 39 and 43 to cause the opening of the gates of the primary and secondary weighing mechanisms. The cams 32 and 320 are formed with a dwell, so that, although the cams are started during the forward movement of the transferring bar 60, yet the gates are not open for a period of time during which said bar is moved to the left to transfer an unfilled package to the scale-pan of the primary weighing mechanism, and a partially filled package to the scale-pan of the secondary weighing machine. The weighing mechanisms of the two machines will now be described.

*Weighing mechanisms.*—The two scale-beams are indicated respectively at 100 and 101. They carry pans 102 103 respectively and at their outer ends are provided with weights 104 105. Each scale-beam is pivoted between its ends upon a support 106, so that each pan is directly below the delivery-port of one of the hoppers. Each of the scale-pans is pivotally supported upon the front end of its beam, and is provided with a shank 107 connected by a link 108 with a pivot on the standard 106, so that as the scale-pan moves up and down, it is maintained in horizontal position. Between the two scale-pans is a flat table or plate 109 upon which the partially-filled packages rest as they are being transferred from a pan 102 to the pan 103. Preferably the upper stretch of the belt 50 is in a plane slightly above the scale-pan 102 when it is in a raised position. The said table is slightly below said pan when it is in a depressed position, said pan 103 is below said table when it is in its raised position, and said belt 54 is slightly below said pan 103 when said pan is depressed. The purpose of this is to permit the accurate transfer of the cartons or packages through the machine.

*Tripping mechanism controlled by the scales.*—Tripping devices are provided for the purpose of controlling the gate opening and closing mechanisms and for controlling the operation of the package-moving mechanism. These tripping devices are also combined with mechanism for controlling the actuation of the stirrers in the hoppers.

Referring now to Figs. 1, 3 and 6, it will be seen that the scale-beam 100 is provided at its rear end with a hook 110 which takes under the end of a trip 111 fulcrumed at 112 in a bracket at the rear of the machine. The outward movement of the trip is stopped at any predetermined points by an adjustable stop-screw 113. A long lever 114, fulcrumed intermediate of its ends upon a stud 115, is connected at its upper end by a link 117 (shown in dotted lines in Fig. 6) but shown in end view with an arm 118 in Fig. 3, keyed to a shaft 119 arranged with its axis from front to rear of the machine. The lower end of the said lever 114 is adapted to be held against the end of the trip 111, so long as the scale-beam 100 is depressed, and the longer end of the said trip is held downward. To the forward end of the shaft 119 is keyed a trip-arm 120 which is adapted to engage the pin 44 of the pawl 38 and disengage said pawl from the ratchet 39 of the gate opening and closing mechanism of the primary hopper. A spring 121 tends to throw the said stop-arm 120 to the right by rocking the shaft, but this is prevented when the lower end of the lever 114 bears against the trip 111. It will be seen, however, that when material is delivered to the package to cause the scale-pan to be depressed, the rear end of the scale-beam rises to lower the shorter end of the trip 111 so as to free the lower end of the lever 114, and permit the spring 121 to rock the shaft 119 and release the pawl 38, to permit it to engage the ratchet 39 and thereby effect a rotation of the cam 32 until the said pin 44 is tripped by the stop 88. The distance to which the cam rotates after it is disengaged by the trip 120 until it is engaged by the trip 88 is sufficient to effect a closure of the gate. From this description, it will be apparent that the opening of the primary hopper is controlled by the forward movement of the package-feeding bar, whereas the closing of the gates is controlled by the scale-beam or the weight of material delivered to the package. The secondary weighing mechanism is similarly controlled by mechanism substantially like that described, including a trip 122, a hook 123 on the scale-beam 101, a stop 124, a long lever 125 (similar to that at 114) fulcrumed at 126 and connected at its upper end by a link 127, and an arm 128 on a shaft 129 (similar to that at 119). The forward end of the shaft 129 carries a trip-arm 130 which is operated to engage, or which is normally held in, the path of the pin 45 of the pawl, but which is moved by the tension of the spring 131 to release said pawl and permit it to engage the ratchet 43 to effect the closing of the gate of the secondary hopper. These two feeding mechanisms, as thus far described, are independent in so far as they control the two gate-closing mechanisms, so that the gates of the primary weighing mechanism may be closed while the gates of the secondary weighing mechanism remains open, and vice versa.

*Trip resetting mechanism.*—For the purpose of resetting the trips 111 and 122, the two levers 114 and 125 are provided at their lower ends with headed studs 140 and 141 respectively, which extend through slots 142 and 143 respectively, of a bar 144, arranged in the rear of said levers. This bar 144 is shown in plan view in Fig. 5 as being loosely engaged by the shorter arm 146 of a bell-crank lever fulcrumed at 147 on a suitable bracket 148 attached to the superstructure of the machine. Said bar is normally in the full-line position in Fig. 4 and in the position shown in Fig. 6, but it is adapted to be moved to the right in both figures to the dotted line position in Fig. 5, for the purpose of moving the levers 125 and 114 in position to be engaged by the trips 122 and 111 respectively. This movement of the bar 144 is effected by a slide 149, whose rear end is connected to the longer arm 150 of the bell-crank and whose forward end is bent so as to be engaged by the rearward movement of the arm 66 of the package-moving mechanism, as graphically represented in Fig. 5.

It will be recalled that the arm 66 is tilted forward, as indicated by the arrow $w$, then moves laterally, as indicated by the arrow $x$, then rearwardly as shown by the arrow $y$, and then laterally to the right to its initial starting-point, as indicated by the arrow $z$. The slide 149 is so located that it is engaged during the rearward movement of the arm 66, and consequently the resetting bar 144 is not actuated until after the weighted packages have been removed from the scale-pan, and they have been replaced by an empty carton on the primary weighing scale, and a partially filled carton on the secondary weighing scale. The scale-pans both rise as the empty and partially filled cartons are placed thereon, and the rear ends of the scale-beams consequently are depressed so that as the slide 149 moves rearward and moves the bar 144 to the right, the said bar, by reason of its pin-and-slot engagement with the levers 114 and 125, moves the lower end of said levers to the right so as to permit the trips 111 and 122 to both drop into the position in which the trip 122 is illustrated in Fig. 6. The movement of the bar 144 draws both trip-arms 120 and 130 into positions to engage the pins 44 and 45 of the pawls 38 and 42, hereinbefore described.

*Mechanism for controlling the operation of package transferring mechanism.*—The mechanism will now be described by means of which the package-transferring mechanism is controlled by the trip mechanism. Reference may be had to Figs. 1, 3, 6 and 8. Rigidly connected to the shaft 119 is an arm 160 shown in dotted lines in Fig. 6, and in full lines in Fig. 2. This arm extends laterally to the left from the shaft 119 and it is formed in its end with a segmental slot 161. There is loose upon the said shaft a similar arm 162 having a slot 163. The last-mentioned arm 162 has connected to it at right angles another arm 164 arranged at right angles thereto, the upper end of which is connected by the link 165 with an upstanding arm 166, keyed to the shaft 129. The two arms 162 163 lie side by side and through the slots 161 163 therein extends a stud 167, projecting from the upper end of a vertical rod 168, the lower end of which is connected to the end of the pivoted trip 80, previously described and shown in Fig. 8. A spring 169 tends to draw the rod 168 downward and to raise the operative end of the trip 80 for the purpose of releasing the pin 79 on the pawl 76, so as to permit said pawl to engage the ratchet 78 and thereby effect the rotation of the shaft 72 to cause the operation of the package-transferring mechanism. When the two trip-arms 120 130 are in their active positions in the path of the pins 44 45 on the pawls 38 42 of the gate opening and closing mechanism, the two arms 160 162 are both raised so as to elevate the rod 168 and hold the trip 80 with its end in position to engage the pin 79 on the pawl 76. The operation of either trip-arm to an inactive position by its respective scale to cause the operation of the gate-closing mechanism for that scale, does not permit the tripping of the bar 168, since the bar would still be held raised by the other arm. But when both arms 160 and 162 are depressed, by the removal of both trip-arms 120 and 130 to the position in which the arm 120 is illustrated in Fig. 6, then the bar 168 will be depressed, the operative end of the trip 80 will be raised, the pawl 76 will engage the ratchet 78, and the shaft 72 will be rotated one complete rotation to effect the transfer of the packages. And as said package-moving mechanism is operated, it resets the trip-arms 118 128, as previously described, and the resetting of said arms causes the resetting of the trip 80 to the connections described so that when the shaft 72 has completed one rotation, the pawl 76 is disengaged from the ratchet 78 by the trip 80.

*Stirrer operating mechanism.*—In addition to the mechanism thus described, mechanism is employed for agitating the stirrers in the hoppers 12 and 13. It is desired that these stirrers should be operated only when the gates are open, and to accomplish this result, the stirrer mechanism is controlled by the gate opening and closing mechanism. As the stirrer mechanisms and the controlling devices therefor are alike, only one of them need be described in detail.

The shaft 14 in the hopper is formed with stirrer-arms 180. It projects through the hopper and is provided with a sprocket-wheel 181 driven by a chain 182 from a sprocket-wheel 183 loose on the shaft (see Fig. 3). One face of the sprocket-wheel 183 is internally beveled (not shown) to be engaged by a clutch-member 184, keyed to slide upon the shaft 30. This clutch-member 184 is grooved as at 185, to receive an arrow or pin upon the end of a lever 186, pivoted intermediate of its ends upon a support 187, forming a part of the upper framework or superstructure of the machine. Likewise pivoted upon said support is a bell crank whose arm 188 is connected to the gate opening and closing bar 34. The other arm 189 is connected to a bar 190, which is passed through a block 191 pivoted upon the rear end of the lever 186. This bar 190 has two adjustable blocks 192 193, and there is a spring 194 which is placed between the block 193 and the block 191 on the lever 186. In virtue of this construction, when the gate-operating bar 34 is moved forward, to open the gate, the bell-crank lever 188 is swung about its pivot to oscillate the lever 186 and yieldingly force the clutch 184 into engagement with the sprocket-wheel 183 to connect said sprocket wheel with the shaft 30 and effect a rotation of the stirrer shaft 14, so long as the gates remain open. When the gates are closed, the clutch 184 is disengaged from the sprocket-wheel 183 and the agitation or stirring of the material in the hopper immediately ceases.

*Operation of the machine.*—The operation of the machine may be briefly rehearsed as follows:—Starting with the assumption that upon the two scale-pans are packages, into which material is being delivered to partially fill one, and completely fill the other, the depression of the two scale-pans, as the two packages come to their proper weight, operates the two trips 111 122. Thereupon the two trip-arms 120 and 130 are immediately disengaged from the pawl-pins 44 and 45 and the cams 32 and 320 immediately commence to close the gates of the two weighing mechanisms. The operation of the trip-arms 120 and 130 is immediately followed by the tripping of the connecting rod 168 and the operation of the trip 80 to release the pawl 76 and permit it to connect the ratchet 78 with the shaft 72. The shaft 72 immediately rotates and causes the operation of the package-moving mechanism. As the package-moving bar 60 moves forward, the hooks 94 95 engage the pins 92 93 on the arms 90 91, and move the trips 88 and 89 out of the path of the pawl-pins 44 and 45 to permit the rotation of the cams 32 and 320, and cause the gates to be opened, for it will be recalled that if the trip-arms 120 and 130 release the pawl-pins 44 and 45, the cams 32 and 320 rotate to the gate-closed position, whereupon said pins 44 and 45 are engaged by the trips 88 and 89. To continue the description of the operation of the package-moving mechanism, the bar 60 moves forward so that its fingers 61 65 engage packages on the belt 50, on the primary weighing scale, and on the table 109. The bar 60 then moves to the left, so as to advance all of said packages one step to the left. This removes the partially filled package from the primary scale, the completely filled package from the secondary scale, replaces the partially filled package by an empty carton from the carrier 50, and the completely filled and weighed package by a partially filled carton from the table 109. The completely weighed and filled package is thrown upon the belt 54 which removes it from the machine. As the bar 60 moves rearward, the arm 66 engages the slide 149 and effects the resetting of the trips 111 122 120 and 130, and therefore the trip 80. As the bars 34 of the gate-operating mechanisms are moved forward by their cams, the clutches 184 are engaged with the sprocket-wheel 183 to effect the rotation of the stirrers in the two hoppers. As soon as the gates are fully opened, the pawl-pins 44 45 are stopped by the trip-arms 120 130 which have been moved to proper position for this purpose by the resetting mechanism. Material continues to flow from the hoppers into the cartons, and as soon as each carton receives its proper weight, the scale-pan drops by the weight of the delivered material, and the trip-mechanism causes the closing of the gates, as described.

Having thus explained the nature of the invention, and described a way of constructing and using the same, although without attempting to set forth all of the forms in which it may be made, or all of the modes of its use, I declare that what I claim is:—

1. A weighing machine comprising a primary weighing mechanism and an independent secondary weighing mechanism, in combination with mechanism for automatically transferring packages simultaneously and individually successively to and from said weighing mechanisms.

2. A weighing machine comprising a primary weighing mechanism for weighing into a package less than the desired ultimate weight of material, secondary weighing mechanism for adding to each partially filled package sufficient material to bring it to said desired weight, and mechanism for transferring packages simultaneously and individually successively to said weighing mechanisms.

3. A weighing machine comprising a primary weighing mechanism, a secondary weighing mechanism, mechanism for transferring packages simultaneously and in succession to said weighing mechanisms, and means by which both said weighing mechanisms control the operation of said package-transferring mechanism.

4. A package-weighing machine comprising two weighing scales adjusted to weigh slightly different loads, a feed hopper provided with a cut-off for each scales, means whereby the cut-offs are opened so that there is feed simultaneously from both hoppers, means whereby the closure of each cut-off is controlled by the poising of its coöperating scales, and means for automatically transferring each package from the lesser-weight, to the greater-weight, scales.

5. A package-weighing machine comprising means whereby at regulated intervals of time a plurality of separated packages in tandem are simultaneously advanced through a fixed distance along a predetermined pathway; two weighing scales adjusted to weigh slightly different loads and so distributed along said pathway that a single package is upon the platform of each scales during each period of rest, and that each package in turn is on the platform of the lesser-weight scales during an earlier period, and on that of the greater-weight, during a later period, of rest; a feed hopper provided with a cut-off directly above the platform of each scales; means whereby, while the packages are at rest, each cut-off is opened, and means whereby the closure of each cut-off is regulated by the poising of its coöperating scales.

6. In a package filling machine, the combination of a primary hopper and a secondary hopper which discharge successively into the same package and which discharge simultaneously into different packages, a cut-off for the primary hopper controlled by the weight of a partially filled package, a cut-off for the secondary hopper controlled by the weight of a filled package, and package-transferring mechanism controlled in operation by the weights of the two packages.

7. In a package-filling machine, the combination of a primary hopper and a secondary hopper each having a gate, a scale in operative relation to each hopper, mechanism for transferring packages individually successively and simultaneously into scales below said hopper, independent gate-closing mechanisms controlled by the tipping of the respective scales, and means by which the tipping of the two scales starts the package-transferring mechanism into action.

8. In a package-filling machine, the combination of a primary hopper and a secondary hopper, each having a gate, independent scales below said hoppers, mechanism for transferring packages simultaneously and individually successively to said scales, mechanisms controlled by said transferring mechanism for opening said gates and controlled by said scales for closing said gates.

In testimony whereof I have affixed my signature, in presence of two witnesses.

WILLIAM S. SCALES.

Witnesses:
R. M. PIERSON,
C. C. STECHER.